United States Patent
Shimota

[19]

[11] Patent Number: 6,021,987
[45] Date of Patent: Feb. 8, 2000

[54] TRASH CONTAINER SUPPORT BRACKET

[76] Inventor: Francis J. Shimota, 9836-50th St. W., Veseli, Minn. 55046

[21] Appl. No.: 09/228,431

[22] Filed: Jan. 11, 1999

[51] Int. Cl.[7] .............................. A47K 1/08; A47G 23/02
[52] U.S. Cl. ......................................... 248/311.2; 248/153
[58] Field of Search ................................ 248/310, 312.1, 248/311.2, 97, 99, 95, 907, 146, 153, 313; 119/61, 60; 141/314, 391; 211/85.18, 85.19, 85.21, 85.22, 85.23

[56] References Cited

U.S. PATENT DOCUMENTS

| | | | |
|---|---|---|---|
| 4,245,807 | 1/1981 | York | 248/310 |
| 4,629,153 | 12/1986 | Marcum | 248/558 |
| 4,655,425 | 4/1987 | Wallace et al. | 248/311 |
| 5,036,799 | 8/1991 | Jordan et al. | 119/61 |
| 5,190,257 | 3/1993 | Gradei et al. | 248/231 |
| 5,286,045 | 2/1994 | Cyphers et al. | 280/47.18 |
| 5,566,917 | 10/1996 | Wu | 248/311.2 |
| 5,839,632 | 11/1998 | Koday | 224/414 |

*Primary Examiner*—Derek J. Berger
*Assistant Examiner*—Michael Nornberg

[57] ABSTRACT

A trash container support bracket has a circular angle bracket base with flexible support arms extending upward there from. Each flexible support arm has an arcuate top portion that accommodates easy coupling with the upper rib portion of trash buckets having upper rib portions formulated to add strength and durability and to accommodate attachment of handles. The flexible support arms are configured to exert a radial inward force against a trash bucket contained therein, thereby firmly retaining the trash bucket in the trash container support bracket.

1 Claim, 4 Drawing Sheets

TRASH CONTAINER SUPPORT BRACKET

BACKGROUND OF THE INVENTION

1. Field of the Invention

The present invention relates generally to support brackets, and more particularly to a trash container support bracket configured to removably secure a refuse bucket or like trash receptacle to a commercial lawn and garden tractor or similar ground maintenance equipment.

2. Description of the Prior Art

In recent years, ground and maintenance equipment such as lawn and garden tractors have become more popular and even necessary to care for and maintain large parcels of public and private property. The present inventor has recently noted that particular types of maintenance personnel, e.g. mowing crews, often complained that they had no place to put trash that was found while they were mowing parks and boulevards for example. This type of problem has most often been addressed by using the maintenance equipment to either shred the various forms of trash, which creates undesirable messes, or otherwise ignore the aforesaid trash altogether. Ignoring the trash during the maintenance process has resulted in various forms of trash, e.g. cans, food wrappers and other types of garbage becoming attached to the feet of the maintenance personnel or otherwise becoming stuck to numerous portions of the maintenance equipment. A further problem that results from trash that cannot be removed prior to the maintenance process is the abuse and destruction of lawnmower blades.

In view of the foregoing, it is apparent that a need exists in the park maintenance industry for a means to collect trash during park maintenance operations or other like maintenance operation such that the trash will not create undesirable environmental messes or otherwise impair the operation of the maintenance equipment. Municipalities and school districts would benefit due to availability of trash collection means configured for use with certain ground maintenance equipment used by those entities.

A number of United States Patents have been directed to the holding of articles.

For example, U.S. Pat. No. 4,245,807 issued Jan. 20, 1981 to York, entitled Bucket Bracket discloses a bucket bracket that is secured to a wall or other vertical support. The bracket disclosed in the '807 patent does not allow for its efficient use with different size buckets due to its fixed vertical height.

U.S. Pat. No. 4,629,153 issued Dec. 16, 1986 to Marcum, entitled Container Holder Device discloses a receptacle for holding a container. The receptacle disclosed in the '153 patent is similar to the bracket disclosed in the '807 patent in that it does not allow for its efficient use with different size containers (due to its fixed upper ring diameter).

U.S. Pat. No. 4,655,425 issued Apr. 7, 1987 to Wallace et al., entitled Universal Cup Holder discloses a cup/can support suspended by a vehicle door and that is adjustable to firmly retain the can or cup. The holder disclosed in the '425 patent, although more versatile than those devices disclosed by York or Marcum, requires a pusher element to retain the can or cup in a firm position and furthermore does not allow for its efficient use with cups or cans that have diameters larger than the fixed diameter of the holder retainer.

Other types of exemplary holders are shown in U.S. Pat. No. 5,036,799 issued Aug. 6, 1991 to Jordan et al.; U.S. Pat. No. 5,190,257 issued Mar. 2, 1993 to Gradei et al.; U.S. Pat. No. 5,286,045 issued Feb. 15, 1994 to Cyphers et al.; U.S. Pat. No. 5,566,917 issued Oct. 22, 1996 to Wu; and U.S. Pat. No. 5,839,632 issued Nov. 24, 1998 to Koday. None of the related prior art has addressed resolution of the problems discovered by the present inventor concerning handling of trash during ground maintenance operations and processes.

SUMMARY OF THE INVENTION

The present invention is directed to a versatile trash container support bracket that is easily attached to and removed from a selected type of ground maintenance equipment such as a lawn and garden tractor. The support bracket most preferably has flexible inverted-V support arms disposed upwardly from a circular base. The inverted-V support arms have arcuate top portions configured to be inserted into the upper lip of a trash bucket thereby firmly retaining the trash bucket in the support bracket. The inverted-V support arms are semi-rigid while still having sufficient flexibility to accommodate trash buckets having different diameters. The circular base of the trash container support bracket is most preferably sized to accommodate the largest size trash bucket desired for use with the selected ground maintenance equipment. In this way, smaller trash buckets can still be firmly retained in the support bracket via insertion of the arcuate portion of each inverted-V support arm into the upper lip of the trash bucket.

The trash container support bracket has a mounting bracket attached that is configured to be easily, quickly and efficiently attached and detached to the selected ground maintenance equipment via desired attachment hardware.

A feature afforded by the present invention is the provision of a trash container support bracket that is configured to be easily and efficiently attached and detached to a desired location on a selected ground maintenance equipment that allows for easy and efficient placement of trash during ground maintenance operations and processes.

Another feature afforded by the present invention is the provision of a trash container support bracket that is configured to be easily and efficiently adjusted to accommodate different size trash buckets.

Yet another feature afforded by the present invention is the provision of a trash container support bracket that is configured to allow fast, easy and efficient placement, removal and replacement of selected trash buckets associated with the trash container support bracket.

Still another feature afforded by the present invention is the provision of a trash container support bracket that is inexpensive to manufacture.

Still another feature afforded by the present invention is the provision of a trash container support bracket that is rugged and highly reliable for its intended outdoor use.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein:

FIG. 6 is a front view of the mounting bracket depicted in FIG. 6A;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENT

The preferred embodiment described herein below, addresses the long felt need by those in the ground maintenance industry to provide a means for collection and removal of trash, garbage and refuse during various turf and/or ground maintenance processes and procedures. The present invention addresses this long felt need by providing a versatile and highly reliable trash container support bracket having all necessary structural features integrated into a rugged, light weight and maintenance free device suitable for use with selected ground maintenance equipment, e.g. lawn and garden tractors.

Figure 1:
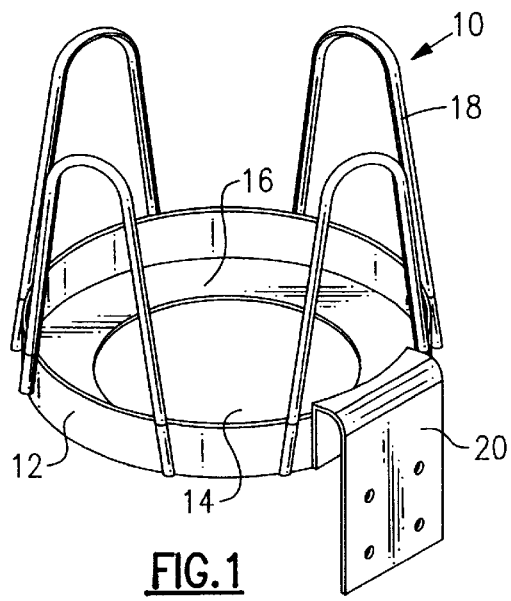
FIG. 1 illustrates a perspective view for one embodiment of the present trash container support bracket.

Referring now to FIG. 1, a perspective view for one embodiment of the present inventive trash container support bracket 10 is illustrated. The novel support bracket 10 can be manufactured via a molding process or can be formulated from individual components that are combined to form the structure depicted in FIG. 1. It is anticipated that individual components would be formulated of galvanized steel or the like and treated by means familiar to those skilled in the art, to prevent rust and corrosion when individual components are constructed of metal such as steel. The present invention is not so limited however, and it will readily be appreciated by those skilled in the art that other manufacturing processes may also be used to formulate the support bracket 10, e.g. casting, forging, extruding, etc. The support bracket 10 most preferably has a plurality of inverted-V support arms 18 preferably attached to a substantially circular base (platform) 16 having a closed vertical side wall (side rail) 12 attached thereto and extending upward from the outer periphery of the circular base 16 to form a circular angle bracket configured to support a trash bucket contained there within. Preferably, the support arms 18 are attached to the platform 16 and side rail 12 at points equidistant from one another. Most preferably the platform 16 has at least one void 14 there through that serves to minimize the weight of the support bracket 10 and minimize the cost of manufacturing the support bracket 10. The void 14 also serves as a means for water and moisture to escape following exposure to rain or washing, for example. A mounting bracket 20 is attached to a selected portion of the side rail 12 to allow for fast and easy attachment and removal of the trash container support bracket 10 to a desired ground maintenance equipment via suitable attachment hardware, e.g. hex nuts, bolts, washers, lock washers, wing nuts, and the like. It is anticipated that the aforesaid attachment hardware will also be galvanized, plated or treated to resist rust and corrosion.

Figure 2:
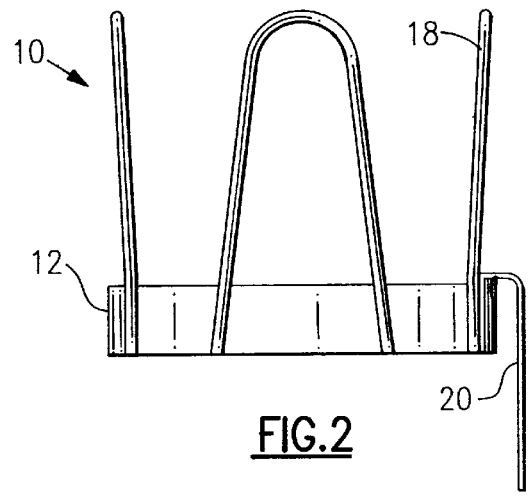
FIG. 2 illustrates a side elevational view of the trash container support bracket depicted in FIG. 1.

FIG. 2 illustrates a side elevational view of the trash container support bracket 10 depicted in FIG. 1. It can be seen that the inverted-V support arms 18 are flexed slightly toward the outer periphery of the side rail 12. The present invention is not so limited however, and it shall be understood that the inverted-V support arms 18 are somewhat flexible such that they can be flexed inward and outward to accommodate different size trash buckets. The mounting bracket 20 is configured so that when the trash container support bracket 10 is attached to a selected ground maintenance equipment, a desired clearance between the side rail 12 and the ground maintenance equipment will allow flexation of the innermost inverted-V support arm(s) 18 toward the ground maintenance equipment to accommodate a larger diameter trash bucket.

Figure 3:
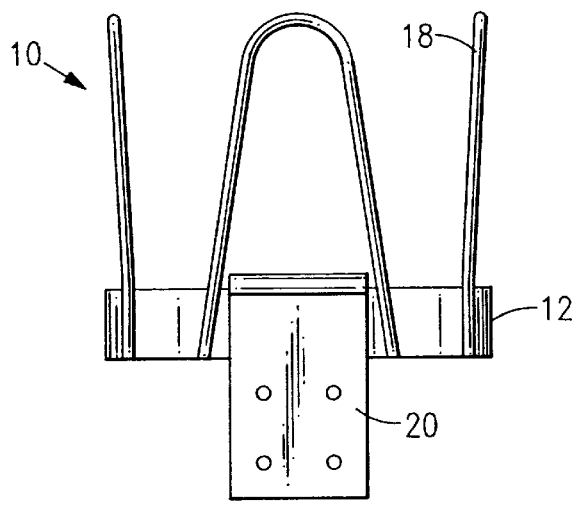
FIG. 3 illustrate another side elevational view of the trash container support bracket depicted in FIG. 1.

FIG. 3 illustrates another side elevational view of the trash container support bracket depicted in FIG. 1. The mounting bracket 20 is shown attached to the side rail 12 between the v-portion of a single inverted-V support arm 18. The present invention is not so limited and it will be appreciated that the mounting bracket 20 could just as well be mounted between two different inverted-V support arms 18 while still retaining its intended functionality.

Figure 4:
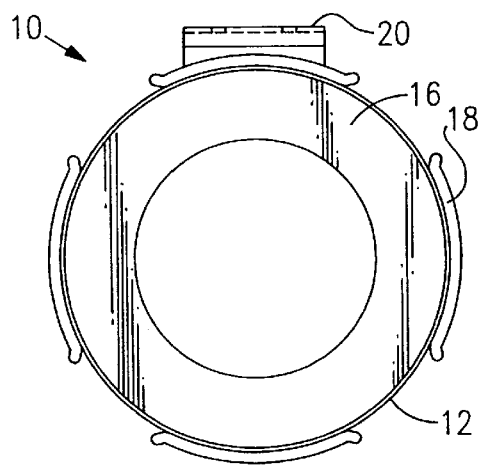
FIG. 4 is a top view of the trash container support bracket depicted in FIG. 1.

FIG. 4 is a downward facing top view of the trash container support bracket 10 depicted in FIG. 1. The inverted-V support arms 18 are shown attached to the side rail 12 at right angles to the platform 16. However, as described herein before, the inverted-V support arms 18 are most preferably formulated of flexible material. For example, the support arms 18 could be constructed of substantially thin metal rods that are sized to allow a desired amount of flexation due to radially applied inward or outward forces. The support arms 18 could also be constructed of impact resistant polystyrene, plastics, or substantially rigid nylon for example, having enough resiliency to retain the desired amount of flexation between the inverted-V support arms and a trash bucket mounted there within. It will be appreciated that the present invention is not limited to the exact support arm 18 embodiment depicted herein to construct the present invention. Other support arm 18 embodiments will also work so long as the necessary combination of structural rigidity and flexibility is maintained to accommodate trash buckets having different diameters and overall heights. For example, the support arms 18 could also be formulated as substantially straight, flexible rod segments having a arcuate top portions or could be formulated as a combination of inverted-v structures and substantially straight structures. The inventor has found the best mode of constructing the embodiments described herein presently include acquisition of desired sizes and types of sheet metal stock and metal rod stock and cutting and bending the necessary metal stock to construct individual components that are subsequently welded together to formulate the aforesaid embodiments.

Figures 5A, 5B:
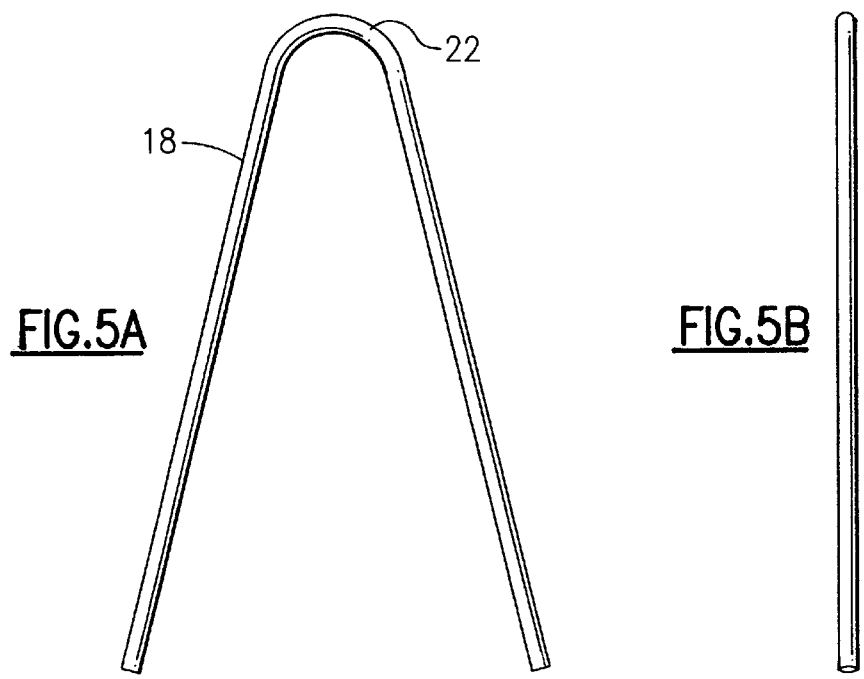
FIG. 5A is an elevational view of an inverted-V support arm suitable for use with the trash container support bracket depicted in FIG. 1.
FIG. 5B is a side view of the inverted-V support arm depicted in FIG. 5A.

FIG. 5A is an elevational view of an inverted-V support arm 18 suitable for use with the trash container support bracket 10 depicted in FIG. 1. Most preferably, the height of the support arm 18 is selected to accommodate the maximum depth of the associated trash bucket to be utilized in combination with the trash container support bracket 10. It can be appreciated that when a smaller trash bucket is used, the smaller trash bucket will be supported solely via the arcuate portion 22 of the inverted-V support arms 18. When used in combination with a trash bucket having the aforesaid maximum depth, the bottom of the associated trash bucket will rest on the platform 16. Those skilled in the art will readily appreciate the present invention is not limited to use with trash buckets having upper lips. The present inventor has found the embodiments described herein also work well to firmly retain trash buckets that do not have upper lip portions.

FIG. 5B is a side view of the inverted-V support arm 18 depicted in FIG. 5A. Most preferably the inverted-V support arm 18 is configured with an arcuate top portion 22 to easily slide into the upper lip of a trash bucket, e.g. conventional five-gallon rubber household bucket having an inverted-u channel provided to add structural integrity and means for attachment of a handle that can also be utilized to provide a secure and firm friction fit between a plurality of support arms 18 and the trash bucket. It can be seen the arcuate top portion 22 also provides an additional safety feature due to elimination of sharp protrusions that can inadvertently injure an equipment operator.

Figures 6A, 6B:
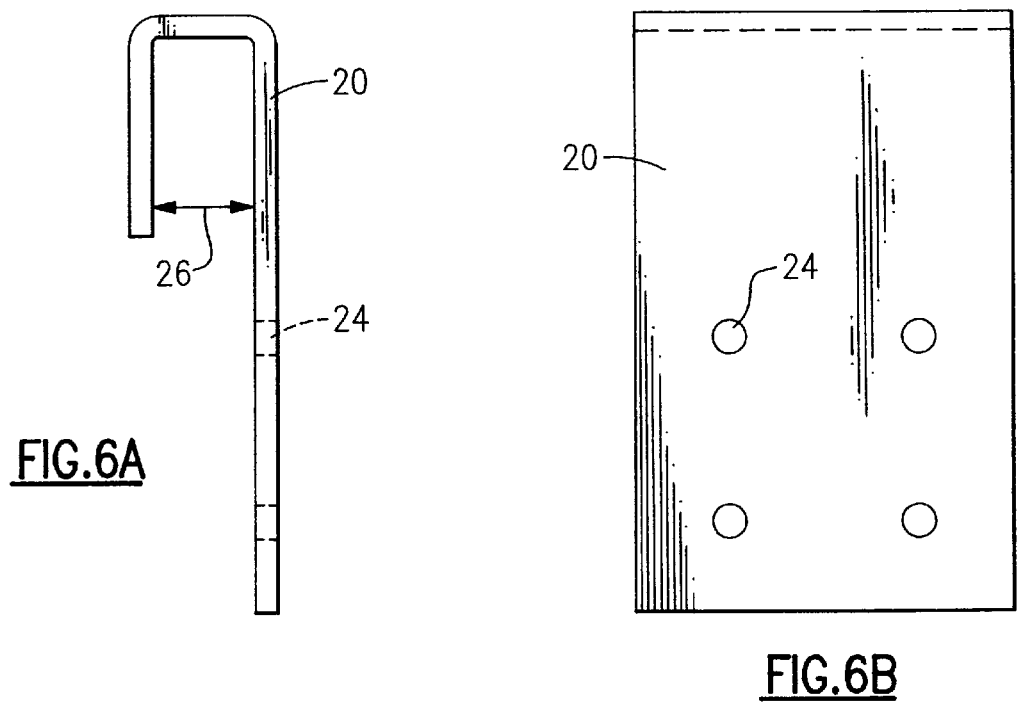
FIG. 6A is a side view of a mounting bracket suitable for use with the trash container support bracket depicted in FIG. 1.

FIG. 6A is a side view of a mounting bracket 20 suitable for use with the trash container support bracket 10 depicted in FIG. 1; and FIG. 6B is a front view of the mounting bracket 20 depicted in FIG. 6A. The present inventor found that a pattern of four mounting holes 24 as shown, served to provide a configuration suitable for providing reliable attachment of the trash container support bracket 10 to a selected maintenance equipment when combined with desired fastening hardware such as described herein above. The present invention is not so limited however, and it will be appreciated that many other mounting hole 24 patterns will also work so long as the intended reliability and functionality of attachment is retained. The gap (space) 26 between the innermost and outermost portions of the mounting bracket 20 is preferably sized to allow a desired amount of flexation to be achieved between the support arm(s) 18 in closest proximity to the associated maintenance equipment upon attachment of the trash container support bracket 10.

Figure 7A:
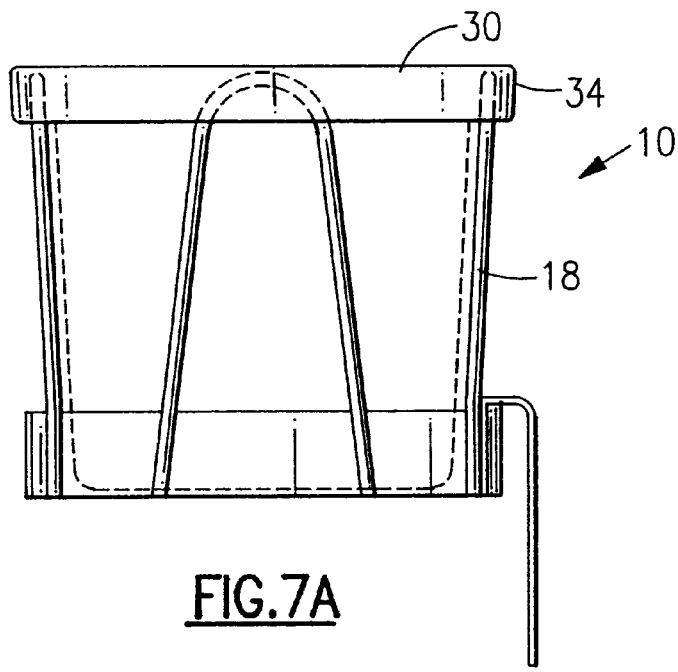
FIG. 7A illustrates a large trash bucket mounted in the trash container support bracket depicted in FIG. 1.
Figure 7B:
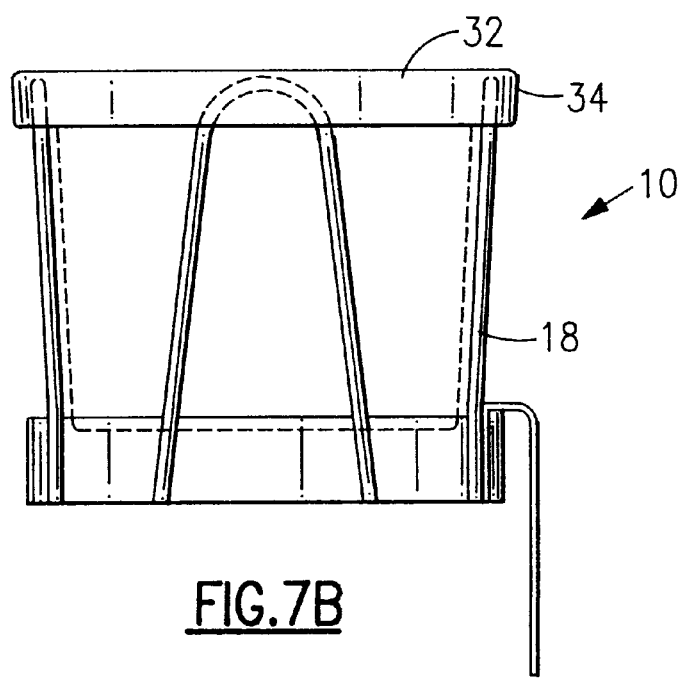
FIG. 7B illustrates a smaller trash bucket mounted in the trash container support bracket depicted in FIG. 1.

FIG. 7A illustrates a large trash bucket 30 mounted in the present trash container support bracket 10 while FIG. 7B illustrates a smaller trash bucket 32 mounted in the present trash container support bracket 10. It will be appreciated that although the inverted-V support arms 18 ideally slide into the inverted upper lip 34 of the associated trash bucket, 30, 32, the support bracket 10 will also function with trash buckets that do not have an upper lip 34, inverted or otherwise as stated herein before. Regardless of the presence or lack thereof of an upper lip 34, the present trash container support bracket 10 inverted-V support arms will continue to exert a radial force toward the center of the associated trash bucket 30, 32 to firmly retain the trash bucket in place and prevent the trash bucket 30, 32 from rattling, shaking and bouncing out of the trash container support bracket 10 and dumping the trash on the ground.

Figure 8:
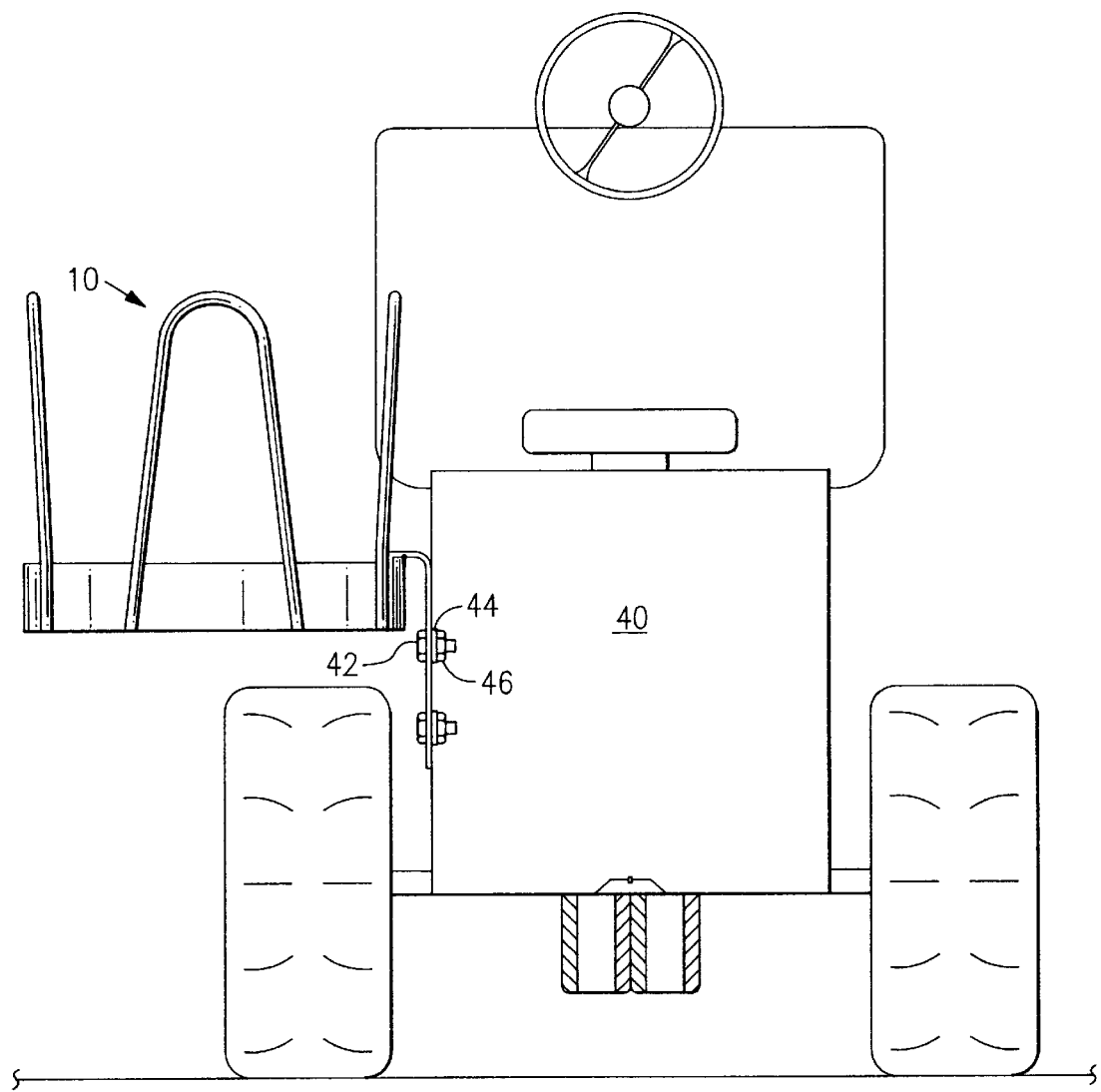
FIG. 8 illustrates the trash container depicted in FIG. 1 attached to a ground maintenance vehicle.

Moving now to FIG. 8, the trash container support bracket 10 depicted in FIG. 1 is illustrated attached to a ground maintenance vehicle 40. The vehicle 40 is depicted as being a self-propelled vehicle, but the present invention is not so limited and those skilled in the art will appreciate the present support bracket 10 could also be attached to a towed implement or vehicle for collection of trash during ground maintenance operations. The ground maintenance vehicle 40 could be a lawn tractor, a garden tractor, a tillage vehicle, a seeding vehicle, or any other type of applicator vehicle, e.g. fertilizer or chemical applicator vehicle for example. The present invention will find uses in other industries such as the agriculture industry as well as the turf and ground maintenance industry. Most preferably the support bracket 10 is attached to the vehicle 40 such that the vehicle operator can easily reach the associated trash bucket 30, 32 and such that neither the trash bucket 30, 32 nor the support bracket 10 will interfere with operation of the maintenance vehicle 40. Preferably, the trash container support bracket 10 will be attached to the maintenance vehicle 40 via a set of hex head bolts 42 having large heads and retained in place via lock washers 44 and hex nuts 46 although other mounting hardware can also be used so long as the desired reliable attachment is retained.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing from the spirit and scope of the present invention, as defined in the claims which follow. For example, it will be apparent to those skilled in the art that although particular component shapes, sizes and unique combinations of novel components have been illustrated, that many other shapes, sizes and combinations of the components will also work to provide the intended functions of selectively providing a portable trash container support bracket which is maintenance free and easy to install on a selected ground maintenance vehicle.

I claim:

1. A trash container support bracket comprising:

a substantially circular base having at least one void disposed there through;

a closed vertical side wall having a top portion, the closed vertical side wall attached to and extending upward from the outer periphery of the circular base to form a circular angle bracket configured to support a trash bucket contained there within;

a plurality of inverted-v support arms attached to the outer periphery of the closed vertical side wall and extending upward from the top portion of the vertical side wall, the plurality of inverted-v support arms configured to restrain horizontal movement of a trash bucket contained there within and wherein each inverted-v support arm is configured with an arcuate top portion capable of removably receiving an inverted upper lip of a trash bucket thereby providing vertical support for a trash bucket, and is further configured to allow inward and outward flexation such that the plurality of inverted-v support arms exert a radial inward force against a trash bucket contained there within; and a wall mounting bracket attached to the vertical side wall, the wall mounting bracket configured to attach the circular angle bracket to a selected ground maintenance vehicle, the wall mounting bracket attached to the vertical side wall further configured to allow flexation of an inverted-v support arm coupled proximal the selected ground maintenance vehicle.

* * * * *